Jan. 26, 1937.  R. S. SANFORD  2,068,962

CONTROL MECHANISM

Filed April 29, 1935

INVENTOR.
ROY. S. SANFORD
BY H. O. Clayton
ATTORNEY

Patented Jan. 26, 1937

2,068,962

UNITED STATES PATENT OFFICE 2,068,962

CONTROL MECHANISM

Roy S. Sanford, New York, N. Y., assignor to Bragg-Kliesrath Corporation, South Bend, Ind., a corporation of New York Application April 29, 1935, Serial No. 18,749

1 Claim. (Cl. 74—512)

This invention relates to control mechanism, particularly, though not necessarily, adapted for use in controlling the power plant of an automotive vehicle.

The principal object of the invention is to provide a compact and effective foot-operated pedal mechanism for selectively operating, either successively, intermittently or concurrently, a plurality of controls, such, for example, as the throttle, clutch, brakes and transmission of a conventional automobile.

Figure 1:
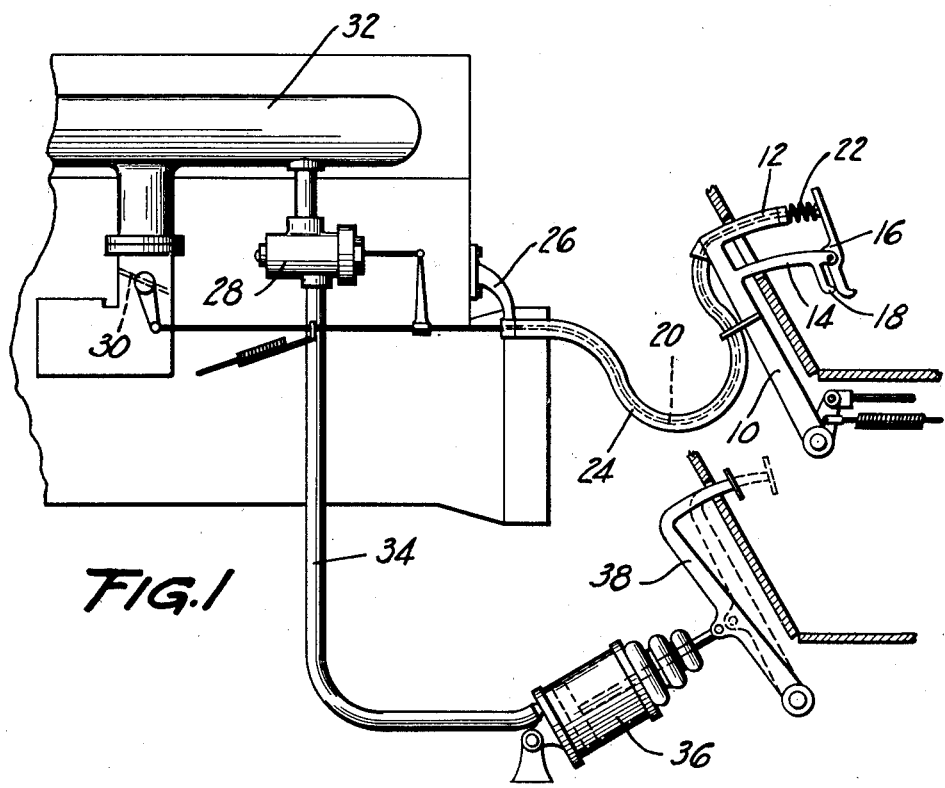
Figure 2:
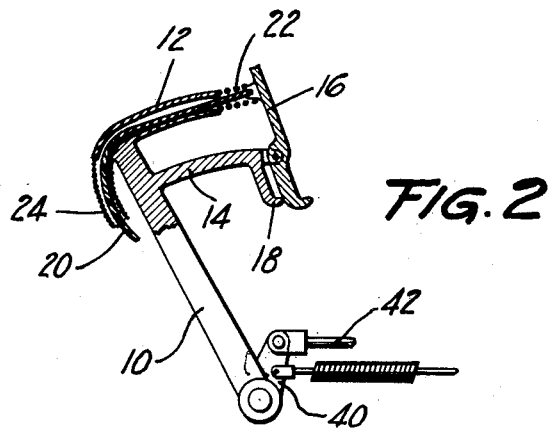

The above and other objects of the invention and desirable details of construction and combinations of parts will become apparent from the following description of a preferred embodiment, which description is taken in conjunction with the accompanying drawing, in which:

Figure 1 is a diagrammatic view disclosing the novel pedal serving as a control medium for the clutch, brakes and throttle of an automotive vehicle; and Figure 2 is a side elevation, partly in section, of the control pedal constituting the instant invention.

As disclosed in Figure 2, the pedal mechanism comprises a pedal member 10, from which extends, in the direction of movement of the pedal, two substantially parallel projecting upper and lower parts 12 and 14 respectively. To the end of the lower part there is pivotally mounted a secondary pedal 16, contactable, at its lower end, with a stop 18 extending from the part 14. The upper part 12, which is hollow, constitutes a portion of the conduit of a Bowden control, a cable 20 of the control extending through the part 12 and being secured to the upper end of the secondary pedal 16. A return spring 22, interposed between the pedal 16 and one end of the hollow part 12, completes the construction of the invention.

The aforementioned pedal device obviously may be employed to control any one or more of several control elements, such, for example, as the throttle, clutch and brakes of an automotive vehicle. Such controls, operated by the novel pedal of the instant invention, constitute the subject matter of my application No. 560,005, filed August 28, 1931, of which the present application is a division.

As disclosed in Figure 1, the Bowden control is completed by a conduit 24 secured to a bracket 26, and the cable 20 is adapted to operate a valve 28 and throttle 30, the valve controlling the passage of air from a manifold 32 through a conduit 34 to a power actuator 36, operatively connected to a clutch pedal 38.

Describing the operation of the pedal mechanism, it is preferable that the driver place his foot in such a position that the foot may be rocked forwardly to actuate the Bowden control, which may, as disclosed, be connected to the throttle and clutch control, or which may be connected to the throttle and to a valve for controlling the change-speed transmission. Upon release of the foot, the secondary pedal is biased to its off position against the stop 18 by the spring 22. A forward bodily movement of the foot with the pressure being applied to the instep serves to impart angular movement to the pedal 10, and, as disclosed in Figure 2, such movement actuates a crank 40 connected by a link 42 to a brake mechanism.

It will also be apparent that by virtue of the novel construction and arrangement of the parts the pedals 10 and 16 may with facility be actuated concurrently, successively or intermittently, as willed by the driver.

While one illustrative embodiment has been described, it is not my intention to limit the scope of the invention to that particular embodiment, or otherwise than by the terms of the appended claim.

I claim:

A pedal having parallel parts extending generally in the direction of its movement and one of which is hollow, a Bowden conduit connected to the hollow part, a secondary pedal pivoted on the other part, and a flexible Bowden connection from the secondary pedal extending through the hollow part and through the Bowden conduit.

ROY S. SANFORD.